United States Patent

Hanson

[11] Patent Number: 5,963,861
[45] Date of Patent: Oct. 5, 1999

[54] DEALER-LOCATOR SERVICE AND APPARATUS FOR MOBILE TELECOMMUNICATIONS SYSTEM

[75] Inventor: Thomas C. Hanson, Boulder, Colo.

[73] Assignee: Lucent Technologies Inc., Murray Hill, N.J.

[21] Appl. No.: 08/628,355

[22] Filed: Apr. 5, 1996

[51] Int. Cl.[6] .................................................. H04Q 7/20
[52] U.S. Cl. .................... 455/422; 455/456; 455/445
[58] Field of Search ................................ 455/422, 415, 455/436, 440, 445, 456, 435

[56] References Cited

U.S. PATENT DOCUMENTS

| | | | |
|---|---|---|---|
| 3,939,417 | 2/1976 | Cannalte et al. . | |
| 3,986,119 | 10/1976 | Hemmer, Jr. et al. . | |
| 4,176,254 | 11/1979 | Tuttle et al. . | |
| 4,406,995 | 9/1983 | May . | |
| 4,724,538 | 2/1988 | Farrell . | |
| 4,757,267 | 7/1988 | Riskin | 379/113 |
| 4,955,050 | 9/1990 | Yamauchi | 379/59 |
| 5,055,851 | 10/1991 | Sheffer | 342/457 |
| 5,095,503 | 3/1992 | Kowalski | 579/59 |
| 5,136,636 | 8/1992 | Wegrzynowicz | 379/207 |
| 5,293,645 | 3/1994 | Sood | 455/54.1 |
| 5,315,636 | 5/1994 | Patel | 379/58 |
| 5,325,419 | 6/1994 | Connolly et al. . | |
| 5,334,974 | 8/1994 | Simms et al. | 340/990 |
| 5,377,256 | 12/1994 | Franklin et al. | 379/59 |
| 5,479,482 | 12/1995 | Grimes | 379/59 |
| 5,592,533 | 1/1997 | McHenry et al. . | |
| 5,613,199 | 3/1997 | Yahagi . | |

*Primary Examiner*—William Cumming
*Assistant Examiner*—Linwood C. Scott, Jr.
*Attorney, Agent, or Firm*—David Volejnicek

[57] ABSTRACT

A dealer-locator service is provided to mobile telephones (40) in a mobile telecommunications system (FIG. 1). When a mobile telephone initiates a call to the dealer-locator service, a mobile telephone switching office (MTSO 41) identifies the one of a plurality of base stations (20-23) through which the call is made. A dealer-locator service apparatus (43-45) then uses this base-station identification, rather than the telephone number of the calling mobile telephone, to look up in a dealer-locator database (300-301) the one of a plurality of business locations (30-33, 50-52) of the dealer that is in the vicinity of the identified base station, and hence in the vicinity of the calling mobile telephone. The apparatus then reports the address of the one business location to the caller, and optionally also causes the MTSO to connect the call to a telephone number of the one business location. The dealer-locator database may be programmed by individually calling the dealer-locator service from each dealer business location via a mobile telephone that is positioned at that dealer business location and supplying that location's address and phone number. The apparatus records the identity of the base station through which the call was made along with the supplied information in the database.

30 Claims, 5 Drawing Sheets

| CALL ID | CALLING/CALLED NUMBER | BASE STATION ID |
|---|---|---|
| | | |
| ⋮ | ⋮ | ⋮ |

FIG. 3

SERVICE PROVIDER ID 5

SERVICE PROVIDER ID 3

| BASE STATION ID | SERVICE PROVIDER ADDRESS | PHONE NUMBER |
|---|---|---|
| 20 | " _ _ _ _ _ " | 30 |
| 21 | " _ _ _ _ _ " | 31 |
| 22 | " _ _ _ _ _ " | 32 |
| 23 | " _ _ _ _ _ " | 32 |
| 23 | " _ _ _ _ _ " | 33 |
| 24 | " _ _ _ _ _ " | 31 |

DEALER-LOCATOR SERVICE AND APPARATUS FOR MOBILE TELECOMMUNICATIONS SYSTEM

TECHNICAL FIELD

This invention relates to mobile wireless telecommunications systems.

BACKGROUND OF THE INVENTION

The dealer-locator service connects a caller to the one of a plurality of business locations of the called party (the "dealer") which is closest to the caller. The dealer-locator service is well-known for stationary calling stations (i.e., conventional wired-in-place telephones). The service uses the calling telephone number to determine the caller's geographical location, and from that information determines the called party's business location that is geographically closest to the caller. Illustrative implementations of the dealer-locator service are disclosed in U.S. Pat. Nos. 4,757,267 and 5,136,636.

While the known dealer-locator service works well for stationary communications stations, it is practically useless for mobile (i.e., portable) communications stations, such as mobile cellular radiotelephones and personal communications services (PCS) wireless handsets. The reason is that the known service uses the calling station's telephone number to derive the caller's geographical location. But the geographical location of a mobile station changes while its telephone number remains the same. Hence, the telephone number of a mobile station is not representative of its location.

Schemes for determining the geographical location of a mobile station are known. One scheme, disclosed in U.S. Pat. No. 5,293,645, uses relative transmission-propagation delays from a mobile station to a plurality of base stations to determine the mobile station's location by using triangulations or other geographical intersection techniques. Consequently, this scheme works only when the mobile station is in simultaneous communication with a plurality (generally at least three) of base stations. Another scheme, disclosed in U.S. Pat. No. 5,479,482, equips each mobile station with a global satellite positioning (GPS) device that determines and reports the mobile station's geo-coordinates, which can then be converted into location information. Consequently, this scheme works only for specially-equipped mobile stations, but not for conventional mobile stations without a GPS device. Neither scheme is therefore useful for implementing a ubiquitous dealer-locator service for conventional mobile telecommunications systems.

SUMMARY OF THE INVENTION

This invention is directed to solving these and other problems and disadvantages of the prior art. Generally according to the invention, when a mobile terminal initiates a call to a dealer-location service, an identification of the base station through which the call is made, rather than the telephone number of the calling station, is used to determine a business location of the dealer that is in the vicinity of the calling station. The address of the determined location is then reported to the caller, and/or the call is extended to the determined location.

According to one aspect of the invention, in a mobile communications system that includes at least one mobile communications station and a plurality of base stations each for communicating with mobile communications stations in a different geographical area, a dealer-locator arrangement serves a plurality of business locations of a service provider that are located in a plurality of the geographical areas. In response to a communication from a mobile communications station that identifies the service provider, the arrangement determines which one of the plurality of base stations is presently communicating with the mobile communications station. Illustratively, this determination is accomplished by the mobile communications system's switching center, or MTSO. The arrangement then uses this determination to determine which one of the plurality of business locations is within a vicinity of the one base station. Illustratively, this is effected via a database lookup in a database whose contents correlate the base stations each with at least one of the business locations that is in the vicinity of the base station. The arrangement then either causes the determined business location (e.g., its address) to be reported to the mobile communications station, or causes a communication (e.g., a phone call) from the mobile communications station to be extended to the determined business location (e.g., to a telephone number that is associated in the database with that business location), or both.

The user of the mobile communications station is thus informed of the whereabouts of, or is connected to, a business location of the service provider that is likely to be one of the closest, if not the closest, to the user at the present time, even though the user is on the move wherefore the user's own geographical position cannot be determined from the user's calling telephone number.

These and other advantages and features of the present invention will become more apparent from the following description of an illustrative embodiment of the invention considered together with the drawing.

DETAILED DESCRIPTION

Figure 1:
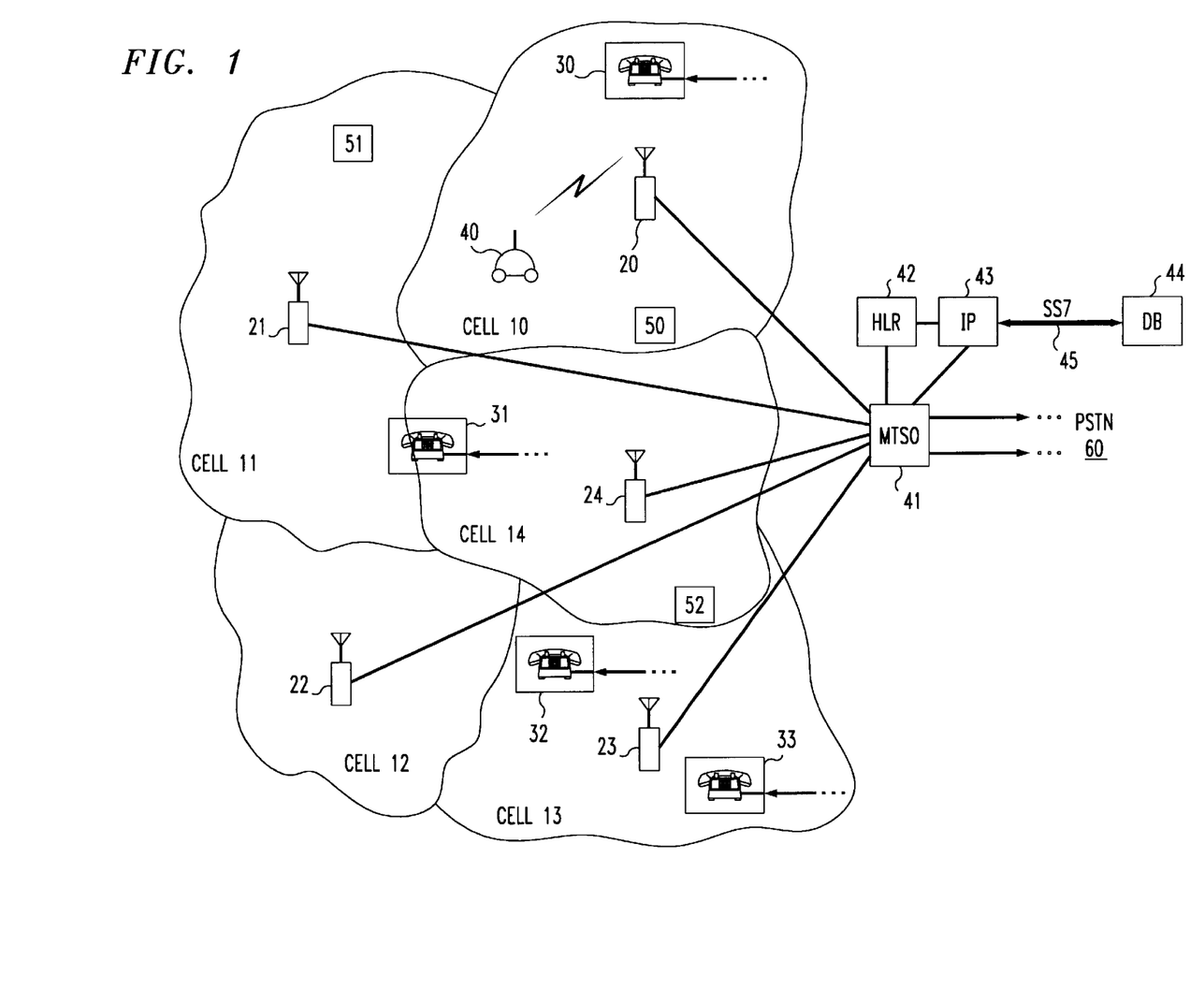
FIG. 1 is a block diagram of an illustrative mobile telecommunications system that includes an illustrative embodiment of the invention.
Figure 2:
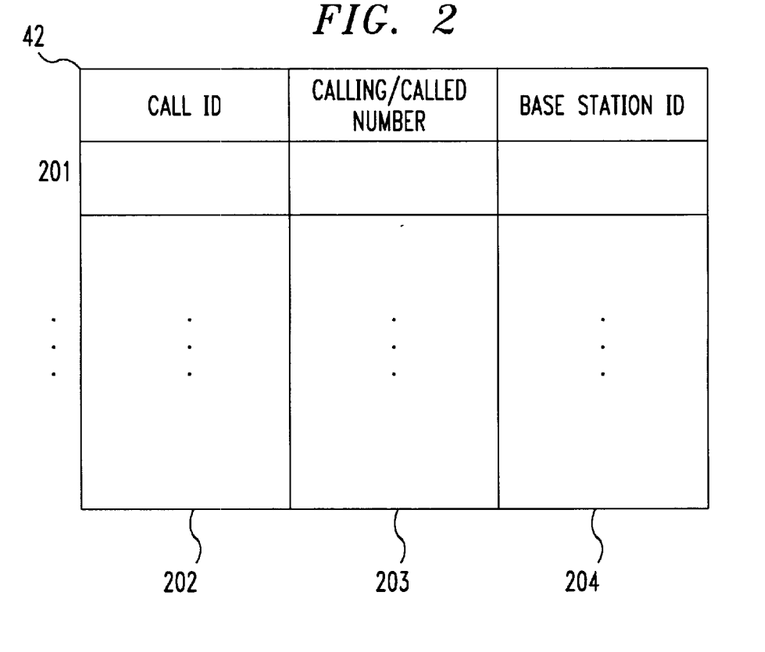
FIG. 2 is a block diagram of records of a home location register database of the system of FIG. 1.

FIG. 1 shows a mobile wireless telephone system comprising a mobile telephone switching center or office (MTSO) 41 connected to the public service telephone network (PSTN) 60 and to a plurality of base stations 20–23, and providing through each base station 20–23 radiotelephone service to mobile telephones 40 in the base station's geographical service area (cell) 10-13, respectively. Associated with MTSO 41 is a home location register database (HLR) 42 of conventional call records of active calls. As shown in FIG. 2, for each active call, MTSO 41 conventionally creates in HLR a record 201 that contains at least a call identifier (ID) entry 202 by which MTSO 41 distinguishes the call from other calls, a telephone number entry 203 of the calling or called mobile telephone 40 that is involved in the identified call, and a base station ID entry 204 of one of the base stations 20–23 that is presently serving the identified mobile telephone 40 during the identified call. Mobile telephones 40 need not have this MTSO 41 as their home MTSO; they can be roaming units outside of their home area.

Located in various places within the geographical areas served by base stations 20–23 are multiple business locations of various service providers ("dealers"). For purposes of this application, a service provider is defined broadly to encompass substantially any multi-location entity or group of entities. For example, a service provider may be a particular pizza restaurant chain, automobile gas and service stations of one or more oil companies, police stations, automatic teller machines (ATMs) of one or more banks, etc. For ease of illustration, FIG. 1 shows four locations 30–33 of one service provider and three locations 50–52 of a second service provider. Some service locations (e.g., pizza restaurants) may have associated telephones, while other service locations (e.g., ATMs) may not have associated telephones. In this illustrative example, locations 30–33 are assumed to be equipped with telephones, while locations 50–52 are assumed to not be equipped with telephones.

According to the invention, there is provided in the system of FIG. 1 an intelligent peripheral (IP) 43, such as a Lucent Technologies Inc. Conversant® interactive voice response system, and a dealer-locator database (DB) 44 which provide dealer-locator services to mobile telephones 40. IP 43 may be connected directly to MTSO 41 and HLR 42 and function as an adjunct processor thereof. Alternatively, IP 43 may be located remotely from MTSO 41 and HLR 42 and be respectively connected thereto via telephone lines of PSTN 60 and a signaling system 7 (SS7) link. IP 43 may also be co-located with and directly connected to DB 44, but is preferably connected to DB 44 via an SS7 link 45. IP 43 is a stored-program-controlled machine that conventionally includes an interface for communicating with other entities of the system of FIG. 1 and including speech recognition and speech synthesis circuitry such as a digital signal processor (DSP), a memory for storing control programs, and a control processor which executes the control programs out of memory to control the operation of IP 43.

Figure 3:
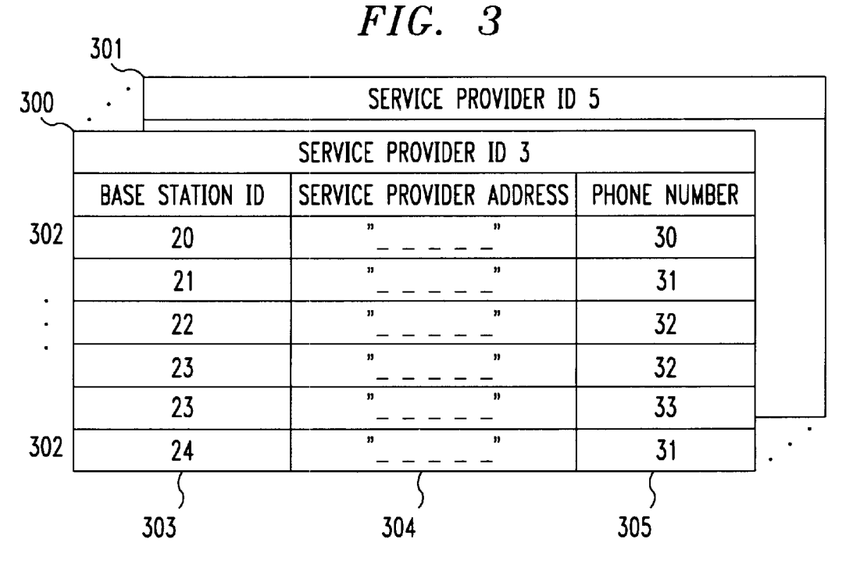
FIG. 3 is a block diagram of databases of a dealer locator database of the system of FIG. 1.

As shown in FIG. 3, DB 44 comprises a collection of one or more databases 300–301, one for each service provider served by the system of FIG. 1. For example, DB 44 comprises a database 300 for a service provider 3 (e.g., a pizza restaurant chain) and a database 301 for a service provider 5 (e.g., an ATM provider). Each database 300–301 comprises a plurality of records 302 that correlate base stations with a dealer's business locations. Each record 302 has at least an entry 303 containing the ID of a base station 20–23 and an entry 304 containing the address of a location 30–33 or 50–52 of the corresponding service provider that lies in the vicinity of the identified base station 20–23. If the service provider's locations 30–33 have telephones, each record 302 further has an entry 305 containing the telephone number of the corresponding location's telephone.

Figure 4:
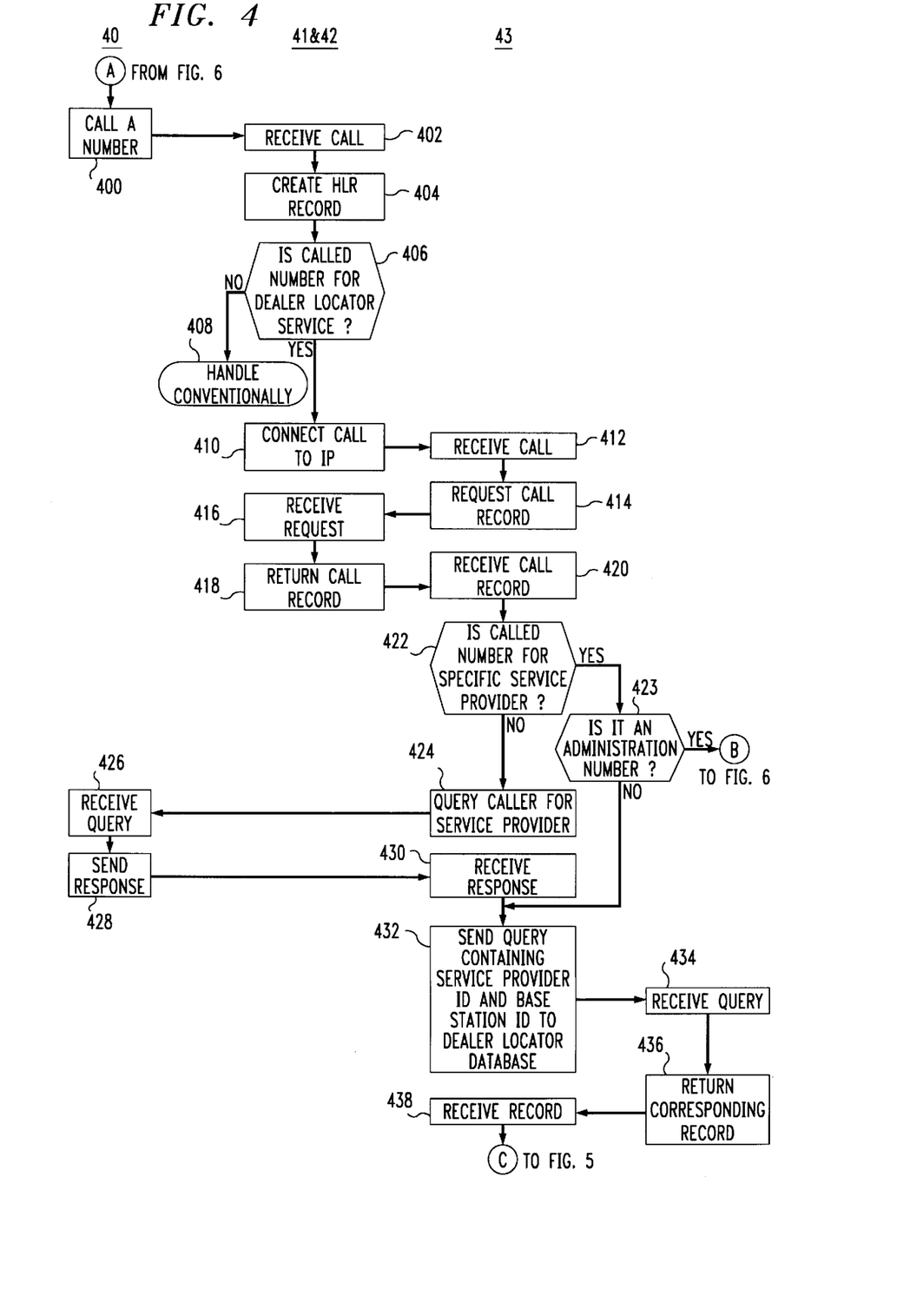
FIGS. 4–5 are a functional flow diagram of operations of the system of FIG. 1 in effecting the illustrative embodiment of a dealer-locator service.

FIG. 4 shows the interactions of elements 40–44 of FIG. 1 in providing the dealer-locator service according this invention. To access the dealer locator service, a user of a mobile telephone 40 conventionally calls the telephone number that is assigned to the dealer locator service, at step 400. The called number may be either a general number for the dealer locator service, or it may be a number for the dealer locator service of a particular one of the service providers for whom the dealer locator service is being provided. Illustratively, these numbers may be "800"-type service numbers. Alternatively, they may be telephone numbers or extension numbers of MTSO 41.

MTSO 41 receives the call generated by mobile telephone 40 at step 400 through one of the base stations 20–23, at step 402, and in response creates a call record 201 for the call in HLR 42, at step 404. As a part of step 404, MTSO 41 assigns a unique call ID to the call. If the called number is not for the dealer locator service, as determined at step 406, MTSO 41 handles the call conventionally, at step 408. If it is determined at step 408 that the called number is for the dealer locator service, MTSO 41 connects the call to IP 43, at step 410. As part of that connection, MTSO 41 passes the call ID to IP 43. IP 43 receives the call and the call ID, at step 412, and in response sends a request to HLR 42 for the call's record 201, at step 414. The request identifies the call by the call ID. HLR 42 receives the request, at step 416, and in response retrieves and returns the call's record 201 to IP 43, at step 418. IP 43 receives the call record 201, at step 420, and checks entry 203 thereof to determine if the called number is of the generic dealer-locator service or if it identifies a specific service provider, at step 422. If the called number is the generic dealer-locator service number, IP 41 generates a query to the caller via the existing call requesting the caller to identify the desired service provider, at step 424. Illustratively, the query is a recorded announcement that is played by IP 43, and the expected response is either a touch-tone signal selecting an item from a menu, or a spoken name of the desired service provider (e.g., "ATM machine", "Luigi's pizza", "service station", etc.) The caller receives the query, at step 426, and in response provides the requisite response, at step 428, which is received by IP 43, at step 430. In response to step 430, or if it was determined at steps 422–423 that the called number is for a specific service provider, IP 43 sends a query to DB 44, at step 432. This query contains a service provider ID, and the base station ID from the call record 201. DB 44 receives the query, at step 434. It uses the service provider ID to select a corresponding one of the databases 300–301, and uses the base station ID to select a corresponding record 302 from the selected database. If there is more than one record 302 for the base station ID, DB 44 selects one of them according to some desired selection criteria. For example, the selection could be random. Alternatively, the selection may be done on a round-robin basis for sequential calls. Furthermore, if the identified base station uses multiple directional antennas to serve different sectors of its cell (e.g., a CDMA system), the selection may be based on which of the antennas is serving the call. DB 44 then returns the selected record 302 to IP 43, at step 436. IP 43 receives the record 302, at step 438, and reports the contents of that record's dealer location address entry 304 to the caller, at step 440. Illustratively, IP 43 voices the record contents to the caller via conventional text-to-speech conversion. Alternatively, record 302 may contain a recorded speech file, in which case IP 43 merely plays back record 302 to the caller. The caller receives this information, at step 442, and becomes informed thereby of a geographically-proximate location of the desired service provider.

Figure 5:
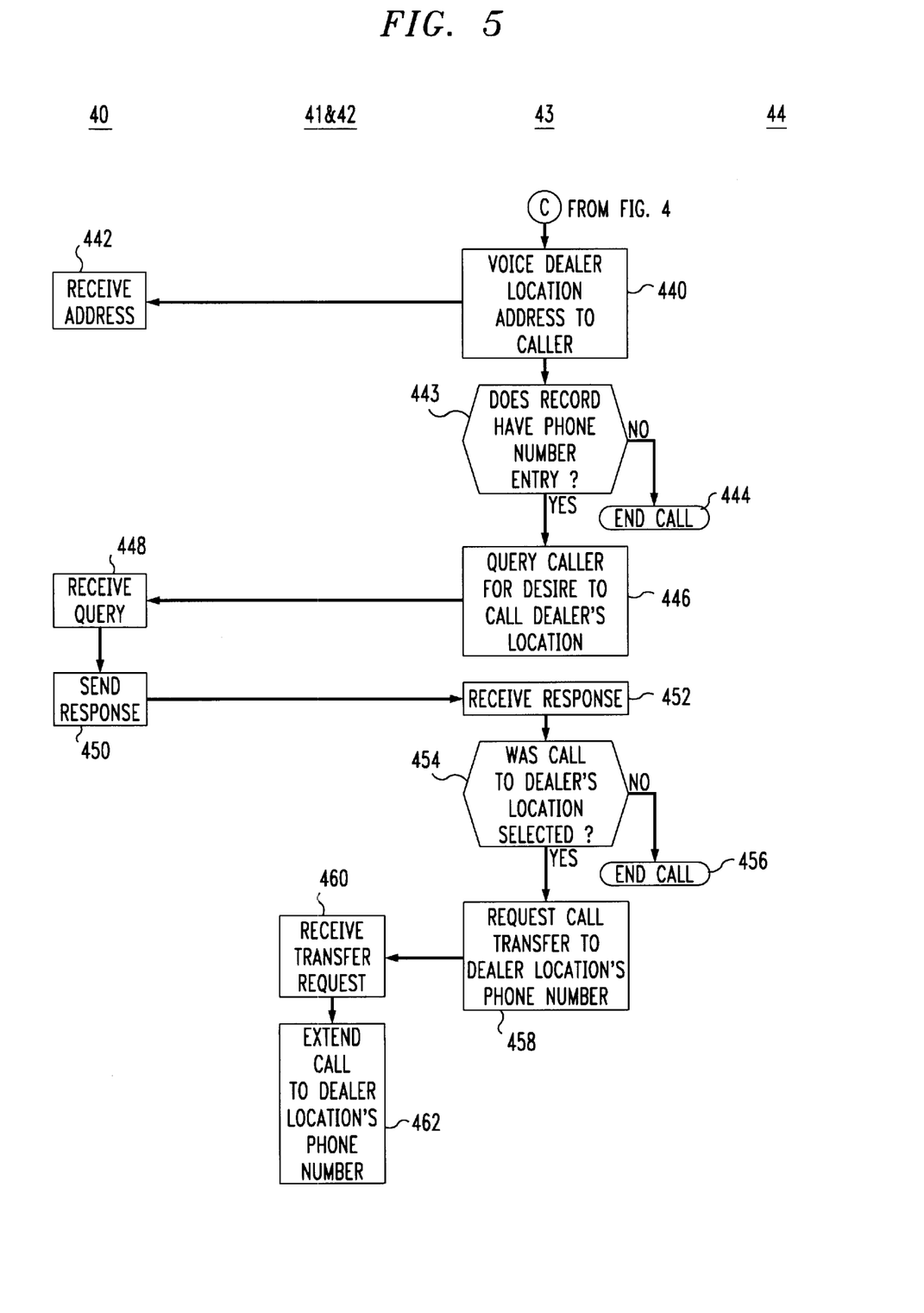

IP 43 also checks entry 305 of the received record 302 to determine if it contains a telephone number, at step 443. If not, its job is done, and so IP 43 causes MTSO 41 to end the call with the caller, at step 444. If the received record 302 contains a phone number in entry 305, IP 43 queries the caller for whether the caller desires to have that number called, at step 446. The caller receives the query, at step 448, and returns a response indicating his or her desire, at step 450. IP 43 receives the response, at step 452, and determines therefrom the caller's desire, at step 454. If the caller does not desire to have the service provider called, IP 43 causes MTSO 41 to end the call with the caller, at step 456. If the caller desires to have the service provider called, IP 43 provides the service provider's number to MTSO 41 and requests MTSO 41 to extend the call to that number, at step 458. MTSO 41 receives the request, at step 460, and in response effects a transfer of the call in a conventional manner, at step 462.

Figure 6:
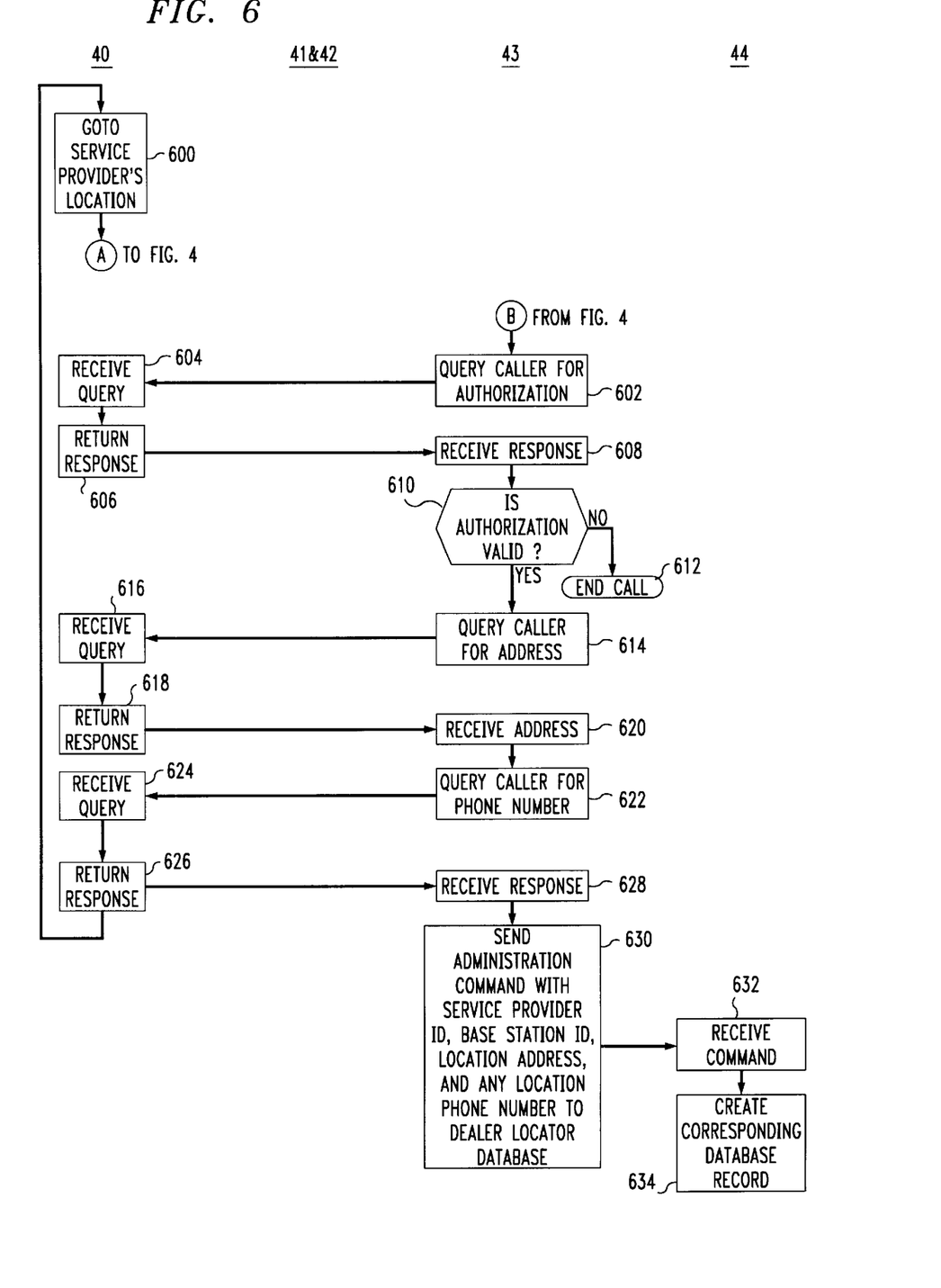
FIG. 6 is a functional flow diagram of operations of the system of FIG. 1 in programming a database of FIG. 3.

Databases 300–301 of dealer locator database 44 may be populated with data in any desired manner. One such manner is shown in FIG. 6. An administrator of DB 44 takes a mobile telephone 40 to a location 30–33 or 50–52 of the service provider whose database 300–301 is being administered, at step 600. The administrator then calls from that location a telephone number that is assigned for administration of the subject database 300–301, and the call is connected through one of the base stations 20–24 and MTSO 41 to IP 43, in the manner shown at steps 400–422 of FIG. 4 and described above. At step 423, IP 43 recognizes the called number as indicating administration of the subject database 300–301, and in response proceeds to step 602 of FIG. 6. At step 602, IP 43 queries the caller for authorization (e.g., a password) to program the subject database 300–301. The administrator receives the query, at step 604, and responds with an authorization code, at step 606. IP 43 receives the authorization code, at step 608, and checks whether it is a valid authorization for administering the subject database 300–301, at step 610. If the authorization is not valid, IP 43 ends the call, at step 612. If the authorization is valid, IP 43 queries the administrator for the address of the location from which the administrator is calling, at step 614. The administrator receives the query, at step 616, and in response speaks the address, at step 618. Alternatively, if mobile telephone 40 is equipped with a keyboard and a modem, the administrator types in the address on the keyboard. IP 43 receives and stores the address, at step 620, and then queries the administrator for a phone number of the service provider's location, at step 622. The administrator receives the query, at step 624, and responds with either the location's phone number or an indication that there is no corresponding phone number, at step 626. The administrator then moves on to a next location of the service provider, returning to step 600 to repeat the above-described process.

IP 43 receives and stores the administrator's response, at step 628. IP 43 then sends an administration command to DB 44 accompanied by the ID of the service provider whose database 300-301 is being administered, the ID of the base station 20–24, through which the call from the administrator was received (this ID was obtained at steps 414–420 of FIG. 4), the location address that was obtained at step 620, and any corresponding telephone number that was obtained at step 628, at step 630. DB 44 receives the command and accompanying data, at step 632, and in response creates therefrom a database record 302 and stores it in the one database 300–301 that is being administered, at step 634.

Of course, various changes and modifications to the illustrative embodiment described above will be apparent to those skilled in the art. For example, a different mobile communications terminal, such as a portable computer equipped with a wireless modem, for example, may be used instead of a mobile telephone. Such changes and modifications can be made without departing from the spirit and the scope of the invention and without diminishing its attendant advantages. It is therefore intended that such changes and modifications be covered by the following claims.

The invention claimed is:

1. A mobile telecommunications system for serving a plurality of geographical areas wherein a plurality of business locations of a service provider are located in a plurality of the geographical areas, the system comprising:

at least one mobile communications station:
a plurality of base stations, each for communicating with mobile communications stations in a different one of the geographical areas;
means responsive to a communication from one mobile communications station and identifying the service provider, for determining which one of the plurality of base stations is presently communicating with the one mobile communications station;
means responsive to the determination of the one base station, for determining which one of the plurality of business locations is within a vicinity of the one base station; and
means responsive to the determination of the business location, for at least one of (a) reporting the determined business location to the one mobile communications station, and (b) extending the communication from the one mobile communications station to the determined business location.

2. The system of claim 1 wherein the means for determining which one of the plurality of business locations is within a vicinity of the one base station comprise:
a database whose contents correlate the base stations each with at least one of the business locations in the vicinity of the base station; and
means responsive to the determination of the one base station, for determining from the contents of the database a business location that is correlated with the one base station.

3. The system of claim 2 wherein:

the database contents correlate the base stations each with at least one of (a) an address and (b) a telephone number, of at least one of the business locations in the vicinity of the base station; and
the means for at least one of reporting and extending comprise
means for at least one of (a) reporting the address of the determined business location to the one mobile communications station, and (b) extending the communication from the one mobile communications station to the telephone number of the determined business location.

4. The system of claim 2 further comprising:

means responsive to a communication, from an individual mobile communications station presently located at an individual one of the business locations, identifying the individual one of the business locations and indicating administration of the service provider, for determining an individual one of the plurality of base stations that is presently communicating with the individual mobile communications station; and
means responsive to the determination of the individual one of the plurality of base stations, for storing in the database a correlation of the individual one of the plurality of base stations with the individual one of the business locations.

5. A dealer locator apparatus for a mobile communications system that includes at least one mobile communications station and a plurality of base stations each for communicating with mobile communications stations in a different geographical area, for serving a plurality of business locations of a service provider located in a plurality of the geographical areas, the apparatus comprising:

means responsive to a communication from one mobile communications station and identifying the service provider, for determining which one of the plurality of base stations is presently communicating with the one mobile communications station;

means responsive to the determination of the base station, for determining which one of the plurality of business locations is within a vicinity of the one base station; and means responsive to the determination of the business location, for at least one of (a) causing the determined business location to be reported to the one mobile communications station, and (b) causing the communication from the one mobile communications station to be extended to the determined business location.

6. The apparatus of claim 5 wherein the means for determining which one of the plurality of business locations is within a vicinity of the one base station comprise:

a database whose contents correlate the base stations each with at least one of the business locations in the vicinity of the base station; and means responsive to the determination of the one base station, for determining from the contents of the database a business location that is correlated with the one base station.

7. The apparatus of claim 6 wherein:

the database contents correlate the base stations each with at least one of (a) an address and (b) a telephone number, of at least one of the business locations in the vicinity of the base station; and the means for at least one of reporting and extending comprise means for at least one of (a) reporting the address of the determined business location to the one mobile communications station, and (b) extending the communication from the one mobile communications station to the telephone number of the determined business location.

8. The apparatus of claim 6 further comprising:

means responsive to a communication, from an individual mobile communications station presently located at an individual one of the business locations, identifying the individual one of the business locations and indicating administration of the service provider, for determining an individual one of the plurality of base stations that is presently communicating with the individual mobile communications station; and means responsive to the determination of the individual one of the plurality of base stations, for storing in the database a correlation of the individual one of the plurality of base stations with the individual one of the business locations.

9. A method of effecting a dealer-locator service in a mobile communications system that includes at least one mobile communications station and a plurality of base stations each for communicating with mobile communications stations in a different geographical area, wherein a plurality of business locations of a service provider are located in a plurality of the geographical areas, the method comprising the steps of:

in response to a communication from one mobile communications station and identifying the service provider, for determining which one of the plurality of base stations is presently communicating with the one mobile communications station;

in response to the determination of the base station, determining which one of the plurality of business locations is within a vicinity of the one base station; and in response to the determination of the business location, at least one of (a) causing the determined business location to be reported to the one mobile communications station, and (b) causing the communication from the one mobile communications station to be extended to the determined business location.

10. The method of claim 9 wherein the step of determining which one of the plurality of business locations is within a vicinity of the one base station comprises the step of:

in response to the determination of the one base station, determining a business location that is correlated with the one base station from the contents of a database whose contents correlate the base stations each with at least one of the business locations in the vicinity of the base station.

11. The method of claim 10 wherein:

the database contents correlate the base stations each with at least one of (a) an address and (b) a telephone number, of at least one of the business locations in the vicinity of the base station; and the step of at least one of reporting and extending comprises the step of at least one of (a) reporting the address of the determined business location to the one mobile communications station, and (b) extending the communication from the one mobile communications station to the telephone number of the determined business location.

12. The method of claim 10 further comprising the steps of:

in response to a communication, from an individual mobile communications station presently located at an individual one of the business locations, identifying the individual one of the business locations and indicating administration of the service provider, determining an individual one of the plurality of base stations that is presently communicating with the individual mobile communications station; and in response to the determination of the individual one of the plurality of base stations, storing in the database a correlation of the individual one of the plurality of base stations with the individual one of the business locations.

13. A mobile telephone system for serving a plurality of geographical areas wherein a plurality of business locations of at least one service provider are located in a plurality of the geographical areas, each business location having at least one of (a) an address and (b) a telephone number associated therewith, the system comprising:

at least one mobile telephone;

a plurality of base stations each located in a different corresponding geographical area and providing wireless call connections to mobile telephones that are presently located in the corresponding geographical area;

a dealer-locator service apparatus;

a switching center connected to the plurality of base stations and to the dealer-locator service apparatus, responsive to receipt of a first call from one mobile telephone identifying the dealer-locator service, for determining an identity of the base station through which the first call was received, and extending the first call to the dealer-locator service apparatus;

means in the dealer-locator service apparatus, responsive to the extended first call, for determining, from the identity of the base station through which the first call was received, which one of the business locations is within a vicinity of the base station through which the first call was received; and means in the dealer-locator service apparatus, responsive to the determination of the one of the business locations, for at least one of (a) reporting the address of the one of the business locations through the extended first call to the one mobile telephone, and (b) causing the switching center to redirect the extended first call to the telephone that is associated with the one of the business locations.

14. The system of claim 13 wherein:

the plurality of business locations comprise
  a plurality of business locations of a plurality of different service providers, located in a plurality of the geographical areas;
  the switching center is responsive to receipt of a first call from the one mobile telephone either identifying the dealer-locator service without also identifying one of the service providers or identifying the dealer-locator service and one of the service providers, for determining the identity of the base station through which the first call was received and extending the first call to the dealer-locator service apparatus; and
the identifying means comprise
  means responsive to an extended first call identifying the dealer-locator service without also identifying one of the service providers, for obtaining via the extended first call from the one mobile telephone an identification of one of the service providers, and
  means responsive either to an extended first call identifying the dealer-locator service and one of the service providers or to the obtained identification of one of the service providers, for determining from the identity of the base station through which the first call was received, which one of the business locations of the identified service provider is within the vicinity of the base station through which the first call was received.

15. The system of claim 13 wherein the means for at least one of reporting and causing comprise:
  means for reporting the address of the one of the business locations through the extended first call to the one mobile telephone;
  means for querying the mobile telephone via the extended first call for whether to call a telephone that is associated with the one of the business locations; and
  means responsive to an affirmative response to the querying, for causing the switching center to redirect the extended first call to the telephone that is associated with the one of the business locations.

16. The system of claim 15 wherein the means for querying comprise:
  means for determining whether a telephone number is associated with the one of the business locations; and
  means responsive to a determination that a telephone number is associated with the one of the business locations, for querying the mobile telephone via the extended first call for whether to call the associated telephone.

17. The system of claim 13 wherein:

the switching center is responsive to receipt of a second call, from an individual mobile telephone that is presently located at an individual one of the business locations, indicating administration of the dealer-locator service apparatus, for determining an identity of the base station through which the second call was received, and extending the second call to the dealer-locator service apparatus;

the dealer-locator service apparatus further comprises
  means responsive to the extended second call, for determining via the extended second call from the individual mobile telephone at least one of (a) the address and (b) the telephone number, of the individual one of the business locations, and
  means for storing the at least one of the address and the telephone number in association with the identity of the base station through which the second call was received; and the means for determining which one of the business locations is within the vicinity comprises
  means responsive to the extended first call, for using the identity of the base station through which the first call was received to retrieve, from the stored associations, the at least one of the address and the telephone number that is associated with the base station through which the first call was received.

18. The system of claim 13 wherein:

the means for determining which one of the business locations is within a vicinity comprises
  a database whose contents correlate the identities of the base stations each with at least one of (a) the address and (b) the telephone number, of at least one of the business locations that is within the vicinity of the base station.

19. A dealer-locator service apparatus for a mobile telephone system that includes at least one mobile telephone, a plurality of base stations each located in a different corresponding geographical area and providing wireless call connections to mobile telephones that are presently located in the corresponding geographical area, and a switching center connected to the plurality of base stations that responds to receipt of a first call from one mobile telephone identifying the dealer-locator service by determining an identity of the base station through which the first call was received and extending the first call to the dealer-locator service apparatus, for serving a plurality of business locations of at least one service provider that are located in a plurality of the geographical areas and wherein each business location has at least one of an address and a telephone number associated therewith, the dealer-locator service apparatus comprising:

means responsive to the extended first call, for determining, from the identity of the base station through which the first call was received, which one of the business locations is within a vicinity of the base station through which the first call was received; and means responsive to the determination of the one of the business locations, for at least one of (a) reporting the address of the one of the business locations through the extended first call to the one mobile telephone, and (b) causing the switching center to redirect the extended first call to the telephone that is associated with the one of the business locations.

20. The apparatus of claim 19 wherein the plurality of business locations comprise:
  a plurality of business locations of a plurality of different service providers, located in a plurality of the geographical areas;

the switching center is responsive to receipt of a first call from the one mobile telephone either identifying the dealer-locator service without also identifying one of the service providers or identifying the dealer-locator service and one of the service providers, for determining the identity of the base station through which the first call was received and extending the first call to the dealer-locator service apparatus; and the identifying means comprise means responsive to the extended first call identifying the dealer-locator service without also identifying one of the service providers, for obtaining via the extended first call from the one mobile telephone an identification of one of the service providers, and means responsive either to the extended first call identifying the dealer-locator service and one of the service providers or to the obtained identification of one of the service providers, for determining from the identity of the base station through which the first call was received, which one of the business locations of the identified service provider is within the vicinity of the base station through which the first call was received.

21. The apparatus of claim 19 wherein the means for at least one of reporting and causing comprise:

means for reporting the address of the one of the business locations through the extended first call to the one mobile telephone;

means for querying the mobile telephone via the extended first call for whether to call a telephone that is associated with the one of the business locations; and means responsive to an affirmative response to the querying, for causing the switching center to redirect the extended first call to the telephone that is associated with the one of the business locations.

22. The apparatus of claim 21 wherein the means for querying comprise:

means for determining whether a telephone number is associated with the one of the business locations; and means responsive to a determination that a telephone number is associated with the one of the business locations, for querying the mobile telephone via the extended first call for whether to call the associated telephone.

23. The apparatus of claim 19 wherein:

the switching center is responsive to receipt of a second call, from an individual mobile telephone that is presently located at an individual one of the business locations, indicating administration of the dealer-locator service apparatus, for determining an identity of the base station through which the second call was received, and extending the second call to the dealer-locator service apparatus;

the dealer-locator service apparatus further comprises means responsive to the extended second call, for determining via the extended second call from the individual mobile telephone at least one of (a) the address and (b) the telephone number, of the individual one of the business locations, and means for storing the at least one of the address and the telephone number in association with the identity of the base station through which the second call was received; and the means for determining which one of the business locations is within the vicinity comprises means responsive to the extended first call, for using the identity of the base station through which the first call was received to retrieve, from the stored associations, the at least one of the address and the telephone number that is associated with the base station through which the first call was received.

24. The apparatus of claim 19 wherein:

the means for determining which one of the business locations is within a vicinity comprises a database whose contents correlate the identities of the base stations each with at least one of (a) the address and (b) the telephone number, of at least one of the business locations that is within the vicinity of the base station.

25. A dealer-locator service for a mobile telephone system that includes at least one mobile telephone, a plurality of base stations each located in a different corresponding geographical area and providing wireless call connections to mobile telephones that are presently located in the corresponding geographical area, and a switching center connected to the plurality of base stations that responds to receipt of a first call from one mobile telephone identifying the dealer-locator service by determining an identity of the base station through which the first call was received and extending the first call to the dealer-locator service apparatus, wherein a plurality of business locations of at least one service provider are located in a plurality of the geographical areas and each business location has at least one of an address and a telephone number associated therewith, the dealer-locator service comprising the steps of:

receiving from the switching center the extended first call;

in response to the received extended first call, determining, from the identity of the base station through which the first call was received, by the switching center, which one of the business locations is within a vicinity of the base station through which the first call was received; and in response to the determination of the one of the business locations, at least one of (a) reporting the address of the one of the business locations through the extended first call to the one mobile telephone, and (b) causing the switching center to redirect the extended first call to the telephone that is associated with the one of the business locations.

26. The service of claim 25 wherein the plurality of business locations comprise a plurality of business locations of a plurality of different service providers, located in a plurality of the geographical areas;

the switching center responds to receipt of a first call from the one mobile telephone either identifying the dealer-locator service without also identifying one of the service providers or identifying the dealer-locator service and one of the service providers, by determining the identity of the base station through which the first call was received and extending the first call to the dealer-locator service apparatus; wherein the step of identifying comprises the steps of in response to the extended first call identifying the dealer-locator service without also identifying one of the service providers, obtaining via the extended first call from the one mobile telephone an identification of one of the service providers, and in response either to the extended first call identifying the dealer-locator service and one of the service providers or to the obtained identification of one of the service providers, determining from the identity of the base station through which the first call was received, which one of the business locations of the identified service provider is within the vicinity of the base station through which the first call was received.

27. The service of claim 25 wherein
the step of at least one of reporting and causing comprises the steps of:
  reporting the address of the one of the business locations through the extended first call to the one mobile telephone;
  querying the mobile telephone via the extended first call for whether to call a telephone that is associated with the one of the business locations; and
  in response to an affirmative response to the querying, causing the switching center to redirect the extended first call to the telephone that is associated with the one of the business locations.

28. The service of claim 27 wherein
the step of querying comprises the steps of:
  determining whether a telephone number is associated with the one of the business locations; and
  in response to a determination that a telephone number is associated with the one of the business locations, querying the mobile telephone via the extended first call for whether to call the associated telephone.

29. The service of claim 25 wherein
the switching center is responsive to receipt of a second call, from an individual mobile telephone that is presently located at an individual one of the business locations, indicating administration of the dealer-locator service apparatus, for determining an identity of the base station through which the second call was received, and extending the second call to the dealer-locator service apparatus;
the dealer-locator service further comprises the steps of:
  in response to the extended second call, determining via the extended second call from the individual mobile telephone at least one of (a) the address and (b) the telephone number, of the individual one of the business locations, and
  storing the at least one of the address and the telephone number in association with the identity of the base station through which the second call was received; and wherein
the step of determining which one of the business locations is within the vicinity comprises the step of
  in response to the extended first call, using the identity of the base station through which the first call was received to retrieve, from the stored associations, the at least one of the address and the telephone number that is associated with the base station through which the first call was received.

30. The service of claim 25 wherein
the step of determining which one of the business locations is within a vicinity comprises the step of:
  consulting a database whose contents correlate the identities of the base stations each with at least one of (a) the address and (b) the telephone number, of at least one of the business locations that is within the vicinity of the base station.

* * * * *